US010253186B2

(12) United States Patent
Khokhani et al.

(10) Patent No.: US 10,253,186 B2
(45) Date of Patent: Apr. 9, 2019

(54) PIGMENT FOR PAPER AND COATINGS

(71) Applicant: BASF Corporation, Florham Park, NJ (US)

(72) Inventors: Ashok Khokhani, Manalapan, NJ (US); Ismail Yildirim, Milledgeville, GA (US); Richard Berube, Holmdel, NJ (US); Sharad Mathur, Tega Cay, SC (US); Anthony N. Lake, Tega Cay, SC (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 15/453,192

(22) Filed: Mar. 8, 2017

(65) Prior Publication Data
US 2017/0260396 A1 Sep. 14, 2017

Related U.S. Application Data

(60) Provisional application No. 62/449,298, filed on Jan. 23, 2017, provisional application No. 62/305,252, filed on Mar. 8, 2016.

(51) Int. Cl.
C09C 1/42 (2006.01)
C09D 17/00 (2006.01)
B03B 5/32 (2006.01)
B01D 37/03 (2006.01)
B01D 36/04 (2006.01)
(Continued)

(52) U.S. Cl.
CPC .............. C09C 1/42 (2013.01); B01D 36/045 (2013.01); B01D 37/03 (2013.01); B03B 5/32 (2013.01); C09C 3/043 (2013.01); C09D 17/007 (2013.01); D21H 17/68 (2013.01); D21H 19/40 (2013.01); C01P 2004/32 (2013.01); C01P 2004/51 (2013.01); C01P 2004/52 (2013.01); C01P 2004/61 (2013.01); C01P 2004/62 (2013.01); C01P 2004/90 (2013.01); C01P 2006/12 (2013.01); C01P 2006/19 (2013.01);
(Continued)

(58) Field of Classification Search
CPC ....................... C09C 1/42; C09C 3/043; C01P 2004/51–2004/52
See application file for complete search history.

(56) References Cited

U.S. PATENT DOCUMENTS 3,586,523 A   6/1971   Fanselow et al.
4,246,039 A   1/1981   Mixon
(Continued)

FOREIGN PATENT DOCUMENTS

WO   2007075409 A2   5/2007
WO   2008154614 A1   12/2008

OTHER PUBLICATIONS

Helal, "Kaolin Wet-Processing", The Georgia Kaolins Geology and Utilization—Copyright © 2002 & Haydn H. Murray; Industrial Applicaions of Kaolin; Georgia Kaolin Company,Elizabeth, New Gersy & Hayden H. Murray 2007 / Applied Clay Mineralogy (Occurrences, Processing and Application), May 4, 2012, 9 pages.
(Continued)

Primary Examiner — Alexandre F Ferre
(74) Attorney, Agent, or Firm — Meunier Carlin & Curfman LLC

(57) ABSTRACT

Provided is a kaolin having a finer particle size and a narrower particle size distribution, in combination with suitable morphology. Also provided are a method of preparing the kaolin product and methods of use.

29 Claims, 4 Drawing Sheets

(51) Int. Cl.
*C09C 3/04* (2006.01)
*D21H 19/40* (2006.01)
*D21H 17/68* (2006.01)
*C08K 3/34* (2006.01)

(52) U.S. Cl.
CPC ............ *C01P 2006/60* (2013.01); *C08K 3/34* (2013.01); *C08K 2201/003* (2013.01)

(56) References Cited

U.S. PATENT DOCUMENTS

| | | | |
|---|---|---|---|
| 4,427,450 | A | 1/1984 | Kostansek |
| 4,717,559 | A | 1/1988 | Cummings et al. |
| 5,061,461 | A | 10/1991 | Sennett et al. |
| 5,074,475 | A | 12/1991 | Suitch et al. |
| 5,098,583 | A | 3/1992 | Cobb et al. |
| 5,112,782 | A | 5/1992 | Brown et al. |
| 5,371,051 | A | 12/1994 | Pope et al. |
| 5,393,340 | A | 2/1995 | Slepetys et al. |
| 5,522,924 | A | 6/1996 | Smith et al. |
| 5,537,934 | A | 7/1996 | Jensen et al. |
| 5,624,488 | A | 4/1997 | Forbus et al. |
| 5,856,397 | A | 1/1999 | Pope et al. |
| 6,136,086 | A | 10/2000 | Hen et al. |
| 6,346,145 | B1 | 2/2002 | Hen et al. |
| 7,758,690 | B2 | 7/2010 | Nutbeem et al. |
| 7,811,375 | B2 | 10/2010 | Petrovic et al. |
| 7,854,801 | B2 | 12/2010 | Nemeh et al. |
| 8,557,037 | B2 | 10/2013 | Patel et al. |
| 8,664,319 | B2 | 3/2014 | Folmar et al. |
| 8,911,865 | B2 | 12/2014 | Folmar et al. |
| 2001/0013302 | A1 | 8/2001 | Mathur et al. |
| 2003/0085012 | A1 | 5/2003 | Jones et al. |
| 2005/0178293 | A1 | 8/2005 | Nemeh et al. |
| 2005/0178514 | A1 | 8/2005 | Pring et al. |
| 2006/0009348 | A1 | 1/2006 | Sare et al. |
| 2006/0086289 | A1 | 4/2006 | Mathur et al. |
| 2006/0118664 | A1 | 6/2006 | Sare et al. |
| 2008/0255291 | A1 | 10/2008 | Sare et al. |
| 2009/0129994 | A1 | 5/2009 | Sare et al. |
| 2013/0296469 | A1 | 11/2013 | Blossom et al. |

OTHER PUBLICATIONS

International Search Report and Written Opinion issued in International Application No. PCT/US2017/021306, dated Jul. 7, 2017.

PIGMENT FOR PAPER AND COATINGS

CROSS-REFERENCE TO RELATED APPLICATIONS

This application claims priority to U.S. Provisional Application Ser. No. 62/305,252, filed on Mar. 8, 2016, and U.S. Provisional Application Ser. No. 62/449,298, filed on Jan. 23, 2017, the disclosures of which are incorporated herein by reference in their entireties.

FIELD OF THE DISCLOSURE

The present application relates to pigments for paper coatings, particularly to heat-treated kaolin pigments.

BACKGROUND OF THE DISCLOSURE

In the discussion of the background that follows, reference is made to certain structures and/or methods. However, the following references should not be construed as an admission that these structures and/or methods constitute prior art. Applicants expressly reserve the right to demonstrate that such structures and/or methods do not qualify as prior art.

Kaolin is a naturally-occurring hydrated aluminum silicate crystalline mineral (kaolinite), in the form of hexagonally shaped, stacked platelets of irregular orientation. Hydrous kaolin is characterized by its fine particle size, plate like or lamellar particle shape, and chemical inertness.

Current methods of producing calcined kaolin involve preparing a chemically dispersed blunged/degritted kaolin crude, subjecting it to centrifugation and magnetic separation, followed by spray drying, pulverization, calcination and pulverization. Current techniques for obtaining finer particle size kaolin, such as media grinding, have a detrimental effect on the morphology of the calcined kaolin and a negative impact on performance in the final application of the kaolin product.

Calcination of kaolin at temperatures up to about 1100° C. cements particles together and produces products of improved whiteness and opacity. Such pigments are widely used by the paper, plastics, rubber and paint industries. U.S. Pat. No. 3,586,523 to Fanselow et al, is directed to producing low abrasion fine particle size opacifying calcined kaolin clay, such as the pigments supplied under the registered trademarks ANSILEX® and ANSILEX® 93. Such pigments have an average particle size of about 0.8 microns.

There is an on-going unmet need in the art for a heat-treated kaolin product with both a finer and steeper particle size distribution and useful performance properties and methods of producing same in order to improve performance in various applications. The present disclosure addresses this need.

SUMMARY OF THE DISCLOSURE

The following summary is not an extensive overview. It is intended to neither identify key or critical elements of the various embodiments, nor delineate their scope.

Provided is a heat-treated kaolin having a GE brightness of at least about 92 and a particle size distribution of: equal to or greater than 99% of particles with an equivalent spherical diameter (e.s.d.) of less than 10 microns; equal to or greater than 93% of particles with an e.s.d. of less than 5 microns; equal to or greater than 85% of particles with an e.s.d. of less than 2 microns; equal to or greater than 77% of particles with an e.s.d. of less than 1 microns; and equal to or greater than 25% of particles with an e.s.d. of less than 0.5 micron, wherein the percentages (%) are based on the total weight of the particles in the heat-treated kaolin. The heat-treated kaolin can have a particle size distribution of: 99% to 100% of particles with an e.s.d. of less than 10 microns; 93% to 100% of particles with an e.s.d. of less than 5 microns; 85% to 98% of particles with an e.s.d. of less than 2 microns; 77% to 92% of particles with an e.s.d. of less than 1 microns; and 25% to 46% of particles with an e.s.d. of less than 0.5 micron, wherein the percentages (%) are based on the total weight of the particles in the heat-treated kaolin n.

In some embodiments, the heat treated kaolin can have a +325 mesh residue content of 300 ppm or less. For example, the heat treated kaolin can have a +325 mesh residue content of from 5 ppm to 300 ppm (such as 90 ppm or less, 70 ppm or less, or 50 ppm or less). In some embodiments, the heat-treated kaolin can have a sodium oxide content of less than or equal to 0.25% by weight (such as less than or equal to 0.1% by weight). The titania content of the heat-treated kaolin can be less than or equal to 1.5% by weight.

The heat-treated kaolin can have a GE brightness of at least about 92 to about 96.

The heat-treated kaolin can have median particle size (d50) equal to or less than about 0.65 micron. The heat-treated kaolin can have a median particle size (d50) of 0.50 to 0.65 micron.

The heat-treated kaolin can have an oil absorption of equal to or greater than 100 pounds of oil per 100 pounds of clay (i.e., heat-treated kaolin) (lbs oil/100 lbs heat-treated kaolin). The heat-treated kaolin can have an oil absorption of from greater than 100 to 140 lbs oil/100 lbs heat-treated kaolin (such as from greater than 100 to 130 lbs, from 105 to 120 lbs, or from 105 to 115 lbs oil/100 lbs heat-treated kaolin).

The heat-treated kaolin can have a scattering coefficient at 457 nanometers of equal to or greater than 0.300 $m^2/g$. The heat-treated kaolin can have a scattering coefficient at 457 nanometers of about 0.305 to about 0.335 $m^2/g$.

The heat-treated kaolin can have a scattering coefficient at 577 nanometers of equal to or greater than 0.220 $m^2/g$. The heat-treated kaolin can have a scattering coefficient at 577 nanometers of about 0.223 to about 0.230 $m^2/g$.

The heat-treated kaolin can have a surface area of equal or greater than 17.0 $m^2/g$. For example, the heat-treated kaolin can have a surface area of about 17.0 to about 25.0 $m^2/g$, from about 17.0 to about 21.0 $m^2/g$, or greater than 20.0 $m^2/g$.

The heat-treated kaolin can have an Einlehner abrasion loss equal to or less than 18 $mg/10^5$ rev. The heat-treated kaolin can have an Einlehner abrasion loss of 9 to 18 $mg/10^5$ rev.

The heat-treated kaolin can have a gloss of equal to or greater than 30%. The heat-treated kaolin can have a gloss of about 30% to about 45%.

The heat-treated kaolin can be fully calcined or can be metakaolin.

Also provided is an article of manufacture comprising the heat-treated kaolin of the disclosure. The article can be selected from the group consisting of: a paper product, a paperboard product, a paper coating composition, a ceramic composition, a paint composition, a polymer composition, a rubber composition, an engineered plastic composition, and an ink composition.

The article of manufacture can be a paper product. The article of manufacture can be a thermal paper. The article of manufacture can be a thermal paper having a base layer that comprises the kaolin.

The article of manufacture can be a paint composition.

Also provided is a method for preparing the heat-treated kaolin product of the disclosure. The method comprises the steps of: providing a first kaolin feedstream having at least about 88-89% by weight of the particles having size of 1 μm or less; classifying the first kaolin feedstream by centrifugation to provide a fine particle size distribution of at least about 97-98% by weight of the particles having size of 1 μm or less; filtering the first kaolin feedstream to produce a filter cake; dispersing the filtrate in a sodium-free dispersion agent to provide a second kaolin feedstream; and drying and heat treating the second kaolin feedstream, wherein the method for preparing the heat-treated kaolin does not include a reductive bleaching step. The sodium-free dispersion agent can be an ammonia-based dispersion agent. The second kaolin feedstream can have a pH of about 10.

The method can further comprise flocculating the first feedstream prior to the filtering step.

The heat treating step of the method can comprise calcining at a temperature of from about 900° C. to about 1200° C. to produce a fully calcined kaolin.

The providing step of the method can comprise processing a blunged/degritted hydrous kaolin crude feedstock by a classification step and a beneficiation step to produce the first kaolin feedstream having at least about 88-89% by weight of the particles having size of 1 μm or less. The beneficiation step of the processing step comprises magnetic separation. In certain embodiments, the processing step can further comprise a flotation step and the first kaolin feedstream has at least about 70% by weight of the particles having size of 0.3 μm or less. In some examples, the method can include an ozonation step subsequent to the flotation step. In other embodiments, the processing step can further comprise a selective flocculation step and the first kaolin feedstream has at least about 86% by weight of the particles having size of 0.5 μm or less.

The method can exclude delamination processes. Excluded delamination processes can include ball milling, stirred media grinding, and/or high energy media grinding.

The method can be carried out wherein the classifying step, filtering step, dispersing step, and drying and calcining step exclude a sodium-based dispersion agent.

As envisioned in the present disclosure with respect to the disclosed methods and compositions of matter, in one aspect the embodiments of the disclosure comprise the components and/or steps disclosed therein. In another aspect, the embodiments of the disclosure consist essentially of the components and/or steps disclosed therein. In yet another aspect, the embodiments of the disclosure consist of the components and/or steps disclosed therein.

BRIEF DESCRIPTION OF THE DRAWINGS

For the purpose of illustrating the various products, compositions and methods, there are depicted in the drawings certain embodiments. However, the products, compositions, methods of making them, and methods of their use are not limited to the precise arrangements and instrumentalities of the embodiments depicted in the drawings.

DETAILED DESCRIPTION

Figure 1:
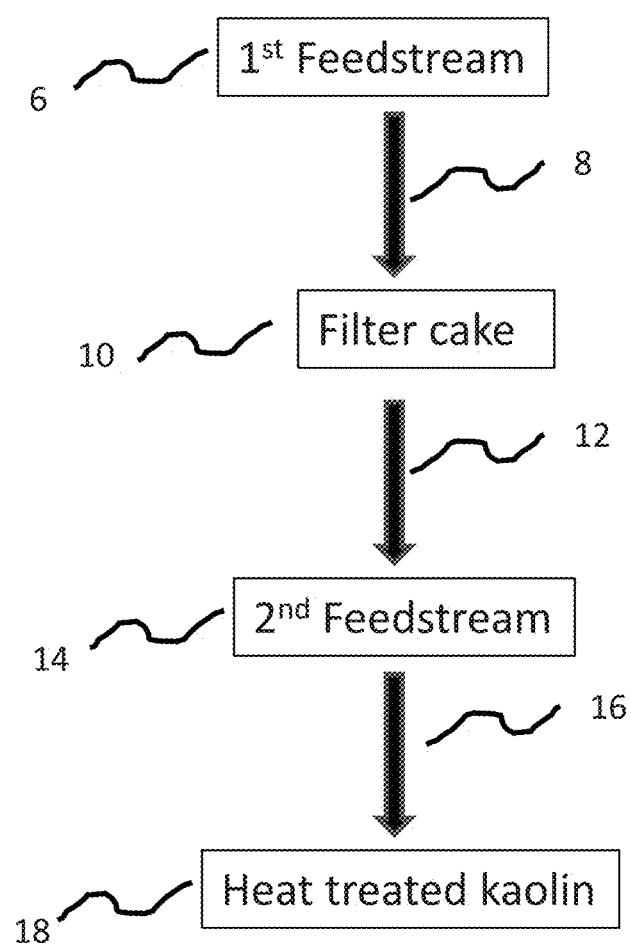
FIG. 1 is a schematic representation of the method of preparing the kaolin of the disclosure.

There is a need in the art for a kaolin product, such as a partially or fully calcined kaolin, with finer and steeper particle size distribution, while possessing appropriate morphology for desired properties. Provided herein is a heat treated kaolin product with finer and narrower particle size distribution compared to current calcined kaolin products. In an embodiment, the kaolin product is fully calcined. The heat-treated kaolin of the present disclosure has an appropriate morphology to provide desired performance that is comparable to or better than current commercially available calcined kaolin products. For instance, the heat-treated kaolin does not have a loss of light scattering coefficient and/or reduced opacity, yet a finer and steeper particle size distribution is achieved. The kaolin of the present disclosure may have an increased light scattering coefficient, increased oil absorption, and/or increased surface area, compared to current commercially available calcined kaolin products. A method of producing the disclosed kaolin is provided. The method includes the use of a dispersant that is free of alkali and alkaline earth metals, and in particular, free of sodium. Products comprising the kaolin of the present disclosure and methods of use of the kaolin are also provided.

Definitions

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

The term "about" will be understood by persons of ordinary skill in the art and will vary to some extent depending on the context in which it is used. As used herein, "about" is meant to encompass variations of ±20%, more preferably ±10%, more preferably ±5%, even more preferably ±1%, and still more preferably ±0.1%.

It is understood that any and all whole or partial integers between any ranges set forth herein are included herein.

Compositions

Provided herein is an improved kaolin, a method of preparing the improved kaolin, and products and compositions comprising the improved calcined kaolin.

The heat-treated kaolin of the disclosure has improved morphology and performance, compared to standard commercial calcined kaolin products. The morphology of the calcined kaolin includes being irregular in shape and having increased void volume. The inventive calcined kaolin pigment has one or more improved properties, such as finer particle size distribution, finer median particle size, increased surface area, increased brightness, reduced abrasion loss, improved oil absorption, lower residue content, lower sodium oxide content, and comparable or increased scattering coefficient. Notably, the oil absorption of the calcined kaolin product of the disclosure is unexpectedly increased, as compared to current commercial products with similar particle size. Moreover, the kaolin product of the disclosure has a finer particle size distribution, while still achieving the correct morphology to provide, for instance, highly desirable scattering properties. The improved kaolin results from the hydrous kaolin processing method disclosed herein. The processing method includes utilizing a finer particle size kaolin feedstream for calcination and not using a dispersant comprising an alkali metal such as sodium. The method in an embodiment uses instead using an ammonia-based dispersant as the filter dispersant prior to calcination to prepare the improved calcined kaolin product. In some cases, the processing method does not utilize bleach, which may result in coarser particles and alter properties such as residue content and/or particle size of the calcined kaolin product.

Particle size distribution (PSD) as used herein is determined with the SEDIGRAPH 5100 particle size analyzer (Micromeretics Corporation) on a calcined kaolin in a fully dispersed condition in a standard aqueous medium, such as water. The data are reported as equivalent spherical diameters (e.s.d.) on a weight percentage basis. The median particle size d50 is the value determined in this way of the particle e.s.d. at which there are 50% by weight of the particles that have an e.s.d. less than the d50 value.

The calcined kaolin of the disclosure has a narrower particle size distribution and finer median particle size.

The calcined kaolin can have a median particle size (d50) of about 0.65 micron or less. For example, the calcined kaolin can have a median particle size of 0.60 micron or less, 0.59 micron or less, 0.58 micron or less, 0.57 micron or less, 0.56 micron or less, 0.55 micron or less, 0.54 micron or less, or 0.53 micron or less. In some embodiments, the calcined kaolin can have a median particle size of 0.50 micron or greater, 0.51 micron or greater, 0.52 micron or greater, 0.53 micron or greater, 0.54 micron or greater, or 0.55 micron or greater. In some embodiments, the calcined kaolin can have a median particle size of from 0.50 to 0.65 micron, 0.50 to less than 0.60 micron, 0.50 to 0.59 micron, 0.50 0.58 micron, 0.50 to 0.57 micron, or 0.52 to 0.58 micron.

Representative ranges for PSD and mean particle size for the calcined kaolin of the disclosure are provided in Table 1. PSD and mean particle size for representative calcined kaolins are provided in Table 2.

TABLE 1

| | Ranges | | | |
|---|---|---|---|---|
| % ≤10 μm | ≥99 | 99-100 | | |
| % ≤5 μm | ≥93 | 93-100 | 94-98 | 96-97 |
| % ≤2 μm | ≥85 | 85-98 | 89-95 | 89-93 |
| % ≤1 μm | ≥77 | 77-92 | 77-90 | 77-86 |
| % ≤0.5 μm | ≥25 | 25-46 | 27-40 | 28-39 |
| % ≤0.3 μm | ≥4 | 4-10 | 4-9 | 4-7 |
| % ≤0.2 μm | ≥0 | 0-6 | 0-5 | 3-5 |
| d50 (μm) | ≤0.65 | 0.50-0.65 | 0.52-0.63 | 0.55-0.63 |

TABLE 2

| | Representative kaolins | | | | |
|---|---|---|---|---|---|
| | A | B | C | D | E |
| % ≤10 μm | 100 | 100 | 99 | 100 | 100 |
| % ≤5 μm | 96 | 97 | 94 | 97 | 97 |
| % ≤2 μm | 91 | 90 | 89 | 93 | 93 |
| % ≤1 μm | 86 | 77 | 82 | 87 | 87 |
| % ≤0.5 μm | 37 | 29 | 33 | 32 | 32 |
| % ≤0.3 μm | 7 | 4 | 7 | 6 | 7 |
| % ≤0.2 μm | 5 | 0 | 3 | 3 | 3 |
| d50 (μm) | 0.57 | 0.63 | 0.59 | 0.59 | 0.59 |

The calcined kaolin of the disclosure has one or more of improved brightness, reduced abrasion loss, improved oil adsorption and increased surface area.

As used herein, brightness is determined by the TAPPI standard method T452. The data are reported as the percentage reflectance to light of a 457 nm wavelength (GEB value).

The calcined kaolin can have a brightness of 92% or greater. For example, the calcined kaolin can have a brightness of 93% or greater, 94% or greater, 95% or greater, 96% or greater, or 97% or greater. In some embodiments, the calcined kaolin can have a brightness of from 92% to 97% or from 92% to 96%.

Kaolin deposits usually contain titania minerals. The titania minerals can be present as polymorphs having the composition $TiO_2$. Natural titania exhibits low brightness, the presence of which can decrease kaolin brightness. The calcined kaolin can have a titania content of 1.5% by weight or less. For example, the calcined kaolin can have a titania content of 1.45% or less, 1.3% or less, 1.2% or less, 1.0% or less, 0.9% or less, 0.8% or less, 0.7% or less, 0.6% or less, or 0.5% or less by weight, based on the total weight of the calcined kaolin. In some embodiments, the calcined kaolin can have a titania content of 0% or greater, 0.5% or greater, or 1% or greater by weight, based on the total weight of the calcined kaolin. In some embodiments, the calcined kaolin can have a titania content of from 0% to 1.45%, from 0.5% to 1.45%, or from 0.5% to 1.2% by weight, based on the total weight of the calcined kaolin.

As used herein, Einlehner abrasion loss is determined by an Einlehner AT 1000 Abrasion tester, using 15 weight % solids and 100,000 revolutions. The Einlehner abrasion is reported in mg loss/100,000 revolutions (mg loss/$10^5$ rev).

The calcined kaolin can have an Einlehner abrasion loss of 18 mg/$10^5$ rev or less. For example, the calcined kaolin can have an Einlehner abrasion loss of 15 mg/$10^5$ rev or less, 12 mg/$10^5$ rev or less, 10 mg/$10^5$ rev or less, or 9 mg/$10^5$ rev or less. In some embodiments, the calcined kaolin can have an Einlehner abrasion loss of 5 mg/$10^5$ rev or greater or 9 mg/$10^5$ rev or greater. In some embodiments, the calcined kaolin can have an Einlehner abrasion loss of from 9 to 18 mg/$10^5$ rev, from 9 to 16 mg/$10^5$ rev, or from 9 to 15 mg/$10^5$ rev.

As used herein, oil absorption is determined using ASTM D 281 "Oil Absorption by Spatula Rub-out." The data are reported in pounds (grams) of oil absorbed per 100 pounds (grams) of calcined kaolin (%).

The calcined kaolin can have an oil absorption of 100% or greater (100 lbs or greater oil per 100 lbs calcined (heat treated) kaolin). For example, the calcined kaolin can have an oil absorption of greater than 100%, 105% or greater, 110% or greater, 115% or greater, 120% or greater, 125% or greater, 130% or greater, or 135% or greater. In some embodiments, the calcined kaolin can have an oil absorption of from 100% to 115%, from 100% to 130%, from greater than 100% to 115%, from greater 100% to 130%, from greater 100% to 140%, from 105% to 120%, from 105% to 130%, from 105% to 140%, from 109% to 130%, or from 109% to 120%.

As used herein, surface area is determined by the art-recognized Brunaruer Emmett Teller (BET) method using $N_2$ as the adsorbate. In brief, the surface area of a calcined kaolin sample, frozen in liquid nitrogen, is measured by adsorption of nitrogen gas and quantified through BET analysis.

The calcined kaolin can have a surface area of 17 $m^2/g$ or greater. For example, the calcined kaolin can have a surface area of greater than 17 m²/g, 18 m²/g or greater, 19 m²/g or greater, 20 m²/g or greater, 21 m²/g or greater, or 22 m²/g or greater. In some embodiments, the calcined kaolin can have a surface area of 25 m²/g or less, 24 m²/g or less, 23 m²/g or less, or 22 m²/g or less. In some embodiments, the calcined kaolin can have a surface area of from 17 m²/g to 25 m²/g, from 17 m²/g to 22 m²/g, from 19 m²/g to 25 m²/g, from greater than 20 m²/g to 25 m²/g, or from 21 m²/g to 25 m²/g.

Representative ranges for brightness, abrasion loss, oil absorption and surface area for the calcined kaolin of the disclosure are provided in Table 3. Brightness, abrasion loss, oil absorption and surface area values for representative calcined kaolins are provided in Table 4.

TABLE 3

| Property | Ranges | | | |
|---|---|---|---|---|
| G.E. Brightness, % | ≥92 | 92-97 | 92-96 | 92-95 |
| Einlehner Abrasion loss in mg/10⁵ rev | ≤18 | 9-18 | 10-16 | 10-15 |
| Oil Absorption, % | ≥100 | 100-115 | 105-115 | 106-113 |
| Surface Area (m²/g) | ≥17.0 | 17.0-23 | 17.5-22 | 17.5-21 |

TABLE 4

| | Representative kaolins | | | | |
|---|---|---|---|---|---|
| Property | A | B | C | D | E |
| G.E. Brightness, % | 92.3 | 92.4 | 94.3 | 93.2 | 92.9 |
| Einlehner Abrasion loss in mg/10⁵ rev | 18.1 | nd | 10.1 | 14.4 | nd |
| Oil Absorption, % | 89 | 109 | 113 | 110 | 110 |
| Surface Area (m²/g) | 16.9 | 17.8 | 20.8 | 19.6 | 19.7 |

"nd" = not determined

The calcined kaolin of the disclosure has improved gloss and/or light scattering.

As used herein, gloss is determined by applying a film of pigment onto optically smooth black glass from a 30% solids (by weight) mixture of pigment and water using a 0.25 mil Bird Bar. Gloss is measured using a Technidyne T480 gloss meter (Technidyne Corporation, New Albany, Ind.) at 75 degrees (PL Method 50C).

The calcined kaolin can have a gloss of 30% or greater. For example, the calcined kaolin can have a gloss of 32% or greater, 35% or greater, 38% or greater, 40% or greater, 42% or greater, 44% or greater, 45% or greater, 46% or greater, 48% or greater, or 50% or greater. In some embodiments, the calcined kaolin can have a gloss of 50% or less, 48% or less, 47% or less, or 46% or less. In some embodiments, the calcined kaolin can have a gloss of from 30% to 50%, from 30% to 45%, from 35% to 50%, or from 35% to 45%.

As used herein, light scattering is determined by applying a film of pigment onto optically smooth black glass from a 30% solids (by weight) mixture of pigment and water using a 0.25 mil Bird Bar. The reflectance values of the pigment films after air drying are measured at wavelengths of 457 nm and 577 nm by means of a reflectance meter having an integrated sphere geometry like an Elrepho reflectometer. The reflectance values are converted by the use of Kubelka-Munk equations to light scattering coefficients (m²/g).

The calcined kaolin can have a scattering coefficient at 457 nanometers of 0.400 m²/g or less. For example, the calcined kaolin can have a scattering coefficient at 457 nanometers of 0.380 m²/g or less, 0.350 m²/g or less, 0.340 m²/g or less, 0.335 m²/g or less, 0.330 m²/g or less, 0.325 m²/g or less, 0.320 m²/g or less, 0.315 m²/g or less, 0.310 m²/g or less, 0.305 m²/g or less, or 0.300 m²/g or less. In some embodiments, the calcined kaolin can have a scattering coefficient at 457 nanometers of greater than 0.300 m²/g, 0.305 m²/g or greater, 0.310 m²/g or greater, or 0.320 m²/g or greater. In some embodiments, the calcined kaolin can have a scattering coefficient at 457 nanometers of from 0.300 m²/g to 0.400 m²/g, from 0.300 m²/g to 0.350 m²/g, from 0.300 m²/g to 0.335 m²/g, or from 0.305 m²/g to 0.335 m²/g.

The calcined kaolin can have a scattering coefficient at 577 nanometers of 0.300 m²/g or less. For example, the calcined kaolin can have a scattering coefficient 577 nanometers of 0.250 m²/g or less, 0.235 m²/g or less, 0.229 m²/g or less, 0.228 m²/g or less, 0.227 m²/g or less, 0.226 m²/g or less, 0.225 m²/g or less, 0.224 m²/g or less, 0.223 m²/g or less, 0.222 m²/g or less, 0.221 m²/g or less, or 0.220 m²/g or less. In some embodiments, the calcined kaolin can have a scattering coefficient at 577 nanometers of greater than 0.220 m²/g, 0.221 m²/g or greater, 0.222 m²/g or greater, 0.223 m²/g or greater, 0.224 m²/g or greater, or 0.225 m²/g or greater. In some embodiments, the calcined kaolin can have a scattering coefficient at 577 nanometers of from 0.220 m²/g to 0.300 m²/g, from 0.221 m²/g to 0.229 m²/g, or from 0.221 m²/g to 0.227 m²/g.

Representative ranges for gloss and light scattering coefficient for the calcined kaolin of the disclosure are provided in Table 5. Gloss and light scattering coefficient values for representative calcined kaolins are provided in Table 6.

TABLE 5

| Property | Ranges | | | |
|---|---|---|---|---|
| Gloss, % | ≥30 | 30-45 | 35-45 | 36-44 |
| S₄₅₇ (m²/g) | ≥0.300 | 0.300-0.400 | 0.305-0.335 | 0.309-0.331 |
| S₅₇₇ (m²/g) | ≥0.220 | 0.220-0.300 | 0.223-0.230 | 0.225-0.229 |

TABLE 6

| | Representative kaolins | | |
|---|---|---|---|
| Property | A | B | C |
| Gloss, % | 43.3 | 36.6 | 31.0 |
| S₄₅₇ (m²/g) | 0.331 | 0.309 | 0.327 |
| S₅₇₇ (m²/g) | 0.229 | 0.225 | 0.227 |

Calcined kaolin products can include a small percentage of oversize particles (coarse residue particles) that can have undesirable effects such as blockage of the die in extrusion processes. These coarse residue particles can also cause deficiencies on the coated paper/thermal paper surface. Further, the coarse residue particles tend to be more abrasive and can therefore result in wear and tear of application equipment. The coarse residue particles will generally be retained on a 325 mesh screen and are referred to herein as +325 mesh residue. The +325 mesh residue may be measured as specified in ASTM C-325-81 (1997).

The calcined kaolin can have a +325 mesh residue content of 300 ppm or less. For example, the calcined kaolin can have a +325 mesh residue content of 280 ppm or less, 250 ppm or less, 230 ppm or less, 200 ppm or less, 180 ppm or less, 150 ppm or less, 120 ppm or less, 100 ppm or less, less than 100 ppm, 95 ppm or less, 90 ppm or less, 80 ppm or less, 70 ppm or less, 60 ppm or less, 50 ppm or less, 40 ppm or less, 30 ppm or less, 25 ppm or less, or 20 ppm or less. In some embodiments, the calcined kaolin can have a +325 mesh residue content of 0 ppm or greater, 5 ppm or greater, 10 ppm or greater, 15 ppm or greater, 20 ppm or greater, 30 ppm or greater, 40 ppm or greater, 50 ppm or greater, 55 ppm or greater, 60 ppm or greater, 65 ppm or greater, or 70 ppm or greater. In some embodiments, the calcined kaolin can have a +325 mesh residue content of from 5 ppm to 300 ppm, from 5 ppm to 250 ppm, from 5 ppm to 200 ppm, from 5 ppm to 150 ppm, from 5 ppm to 100 ppm, from 10 ppm to 300 ppm, from 10 ppm to 200 ppm, from 10 ppm to 100 ppm, from 10 ppm to 80 ppm, from 15 ppm to 300 ppm, from 15 ppm to 200 ppm, from 15 ppm to 100 ppm, or from 15 ppm to 75 ppm.

Calcined kaolin products can include a low alkali content, including sodium oxide and potassium oxide. Sodium oxide and potassium oxide are known to have high thermal expansion values and are thus undesirable in some applications. The calcined kaolin can have an alkali content of 0.25% by weight or less, based on the total weight of the calcined kaolin. In some embodiments, the calcined kaolin can have a sodium oxide content of 0.20% by weight or less, 0.18% by weight or less, 0.15% by weight or less, 0.13% by weight or less, 0.10% by weight or less, 0.08% by weight or less, or 0.05% by weight or less, based on the total weight of the calcined kaolin. In some embodiments, the calcined kaolin can have a sodium oxide content of from 0.05% to 0.20% by weight, 0.05% to 0.15% by weight, or from 0.05% to 0.10% by weight, based on the total weight of the calcined kaolin.

The heat-treated kaolin of the disclosure can comprise any combination of the herein described properties. Thus, the disclosure encompasses a heat-treated kaolin having a PSD as disclosed in Table 1 in combination with a median particle size as disclosed in Table 1 and/or any one or more of the properties disclosed in Tables 3 and 5. The disclosure encompasses a heat-treated kaolin having a PSD as disclosed in Table 1 and having the light scattering values disclosed in Table 5. The disclosure encompasses a heat-treated kaolin having a PSD as disclosed in Table 1 and having the oil absorption values disclosed in Table 3.

A method for preparing the kaolin product is provided. The method is depicted in schematic form in FIG. 1. The method comprises providing a first kaolin feedstream 6 having at least about 88-89% by weight of the particles of size of 1 µm or less; a filtering step 8 of the first feedstream to produce a filter cake 10; a dispersing step 12 of the filter cake in a sodium-free dispersion agent to provide a second kaolin feedstream 14; and a drying and heat treating step 16 of the second kaolin feedstream to produce a heat treated kaolin 18.

Figure 2:
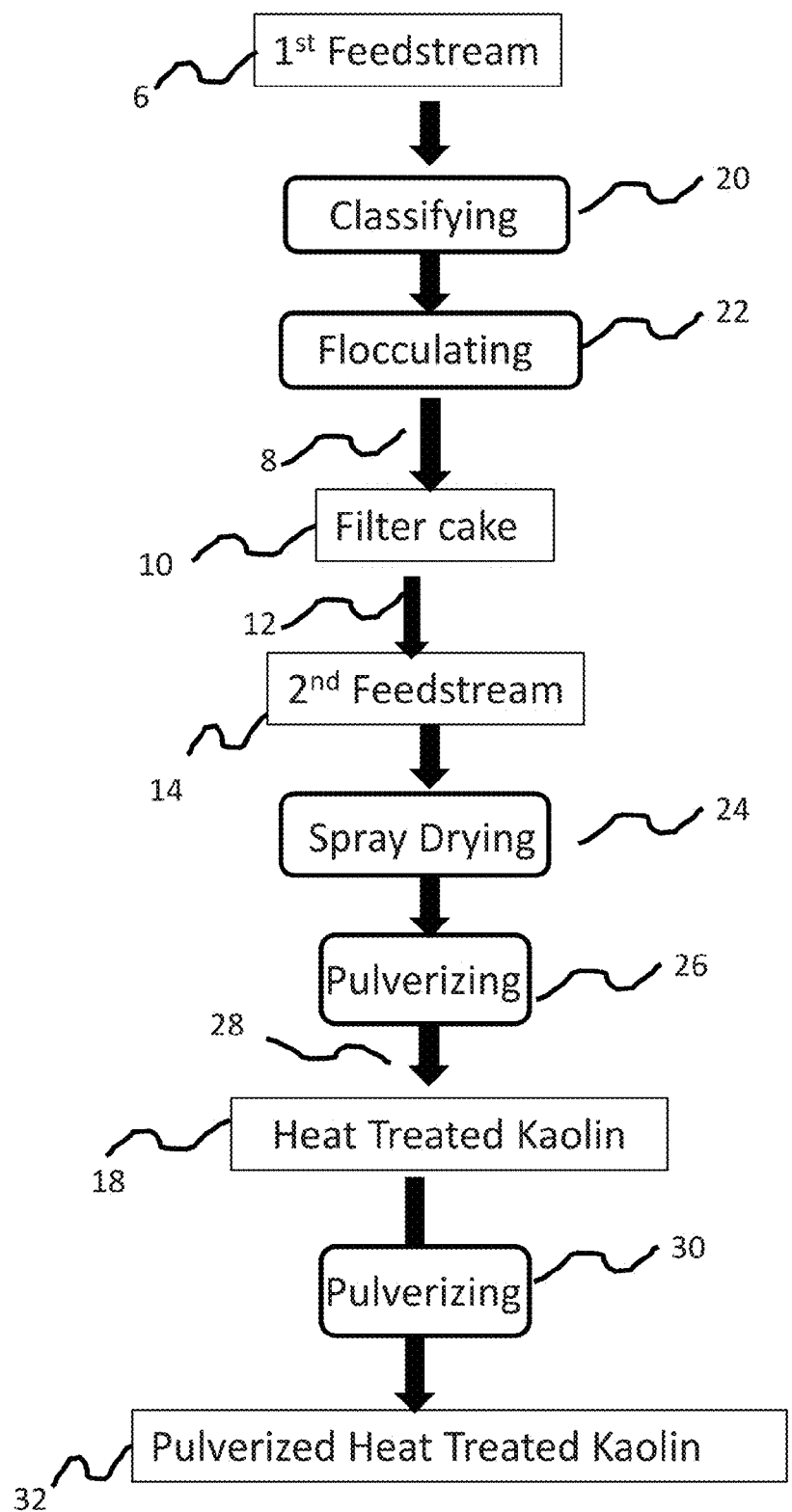
FIG. 2 is a schematic representation of an embodiment of the method of preparing the kaolin of the disclosure.

An embodiment of the method is depicted in schematic form in FIG. 2 in which prior to filtering step 8, the first kaolin feedstream is subject to a step of classifying 20 to produce a finer particle size feedstream having at least 97-98% by weight of particles have size of 1 µm or less. The finer particle size feedstream is subject to a step of flocculating 22, followed by filtering step 8 to produce filter cake 10. Filter cake 10 is subject to the dispersing step 12 to provide second kaolin feedstream 14. Drying and heating step 16 comprises a step of first spray drying 24 the second kaolin feedstream 14 and then subjecting feedstream 14 to a step of pulverizing 26, followed by a step heat treating 28 the pulverized kaolin material to produce heat treated kaolin 18. Optionally, heat treated kaolin 18 is subject to further step of pulverizing 30 to produce a pulverized heat treated kaolin 32.

Figure 3:
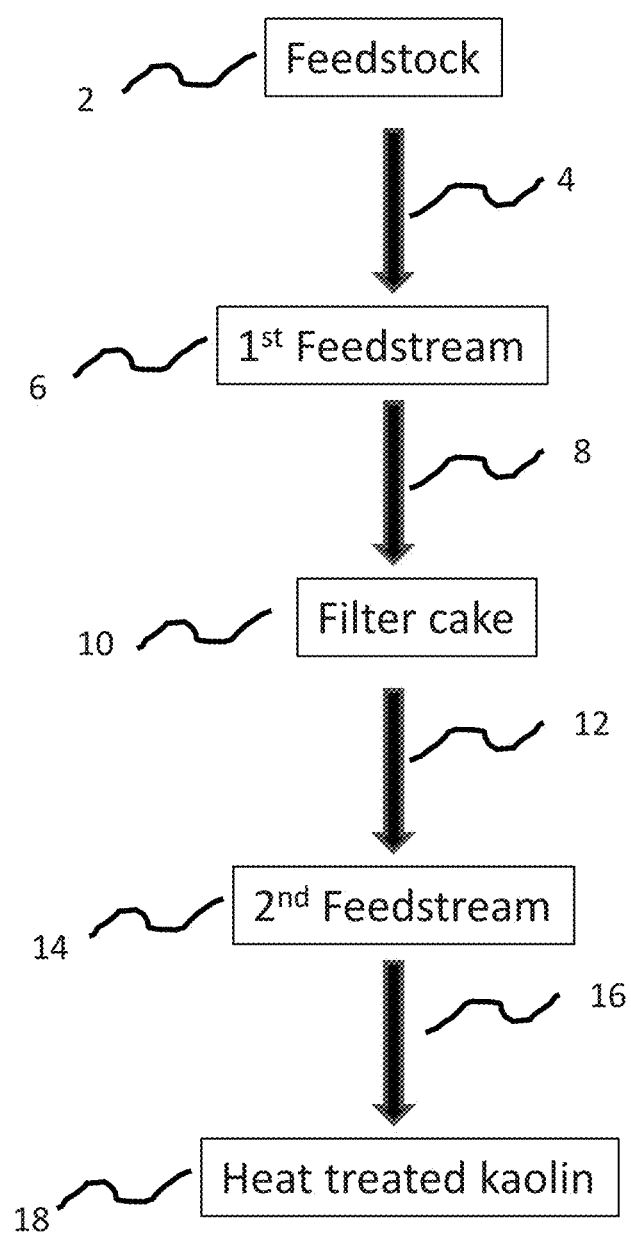
FIG. 3 is a schematic representation of an embodiment of the method of preparing the kaolin of the disclosure.

The method may further comprise producing the first kaolin feedstream 6 by a processing step 4 comprising processing a blunged/degritted hydrous kaolin crude feedstock 2 by a classification step and a beneficiation step to produce the first kaolin feedstream 6. See FIG. 3.

The blunged/degritted hydrous kaolin crude feedstock can be prepared from a kaolin crude using conventional techniques. Any hydrous kaolin crude can be used. Kaolin crudes can be pre-dominantly grey, white, creamy, pink or red/brown in color so the present disclosure provides versatility of using a wide variety of crudes to obtain the final calcined kaolin product.

Typically, the kaolin crude is crushed and made down into a slurry form (blunged in water) with the aid of one or more anionic dispersants through the use of a high-energy mixer known as a blunger. After this blunging step, the pH of the dispersed slurry is usually about 7 to 10. In some embodiments, the slurry has a pH of about 10 (e.g., 9 to 10 or 9.5 to 10). The dispersant may be an organic dispersant or inorganic dispersant. Inorganic dispersant typically include phosphate salts and sodium silicate dispersants. Examples of phosphate salts include inorganic polyphosphates and pyrophosphates (which are actually a type of polyphosphate), such as sodium hexametaphosphate (SHMP), sodium tripolyphosphate (STPP) and tetrasodium pyrophosphate (TSPP). Organic dispersants typically include ammonia-based dispersants, sulfonate dispersants, carboxylic acid dispersants, and polymeric dispersants, such as polyacrylate dispersants, as well as other organic dispersants conventionally employed in kaolin pigment processing. Dispersant blends may be used, such as a blend of sodium carbonate, sodium polyacrylate, sodium silicate, and sodium hydroxide, as disclosed in U.S. Pat. No. 8,664,319.

Oversized particles (grit) consisting largely of sand particles are then removed from the blunged crude by any conventional manner using one or more of sieves, sandboxes, gravity settling, or hydrocyclones. Either wet or dry degritting may be employed. For example, degritting may be performed by combining the crude kaolin with water and passing the slurried mixture through a sieve, such as a 325 mesh sieve or a 200 mesh sieve.

The resulting blunged/degritted hydrous kaolin crude feedstock is then processed by a classification step and a beneficiation step to produce a first feedstream.

Classification (also known as fractionation) and beneficiation (also known as refining) may be accomplished using any known methods. Methods of classification include centrifugation and sedimentation. Appropriate methods include gravity sedimentation or elutriation, any type of hydrocyclone apparatus, or, centrifugation. Examples of suitable centrifuges include Bird solid bowl centrifuge, disc-nozzle high speed centrifuges, horizontal three-phase centrifuges, and the like. High-speed centrifugation serves to separate the blunged/degritted crude kaolin into two streams. In a non-limiting example, centrifugation separates the kaolin into a coarse stream (at least about 80% by weight of the particles have a size of 2 microns or coarser) and a fine stream (at least about 85% by weight of the particles have a size of 1 micron or less). In an embodiment, centrifugation is such that the first feedstream, after beneficiation, has at least about 88-89% by weight of the particles have size of 1 µm or less.

Methods of beneficiation include magnetic separation, selective flocculation, reductive bleaching, filtering, flotation, and ozonation/oxidative bleaching. The methods may be carried out in any suitable manner. In an embodiment, the beneficiation step is magnetic separation. In an embodiment, the beneficiation is ozonation/oxidative bleaching.

Magnetic separation can be effected using a high gradient magnetic separator (HGMS), to magnetically remove colored discrete paramagnetic impurities (principally iron-bearing titania), thus improving brightness. These separators are also known as HIMS units (high intensity magnetic separators). Conventional or improved HGMS separators can be employed for the magnetic separation step. Suitable magnetic separators include any commercial or proprietary "high intensity" magnetic separator.

Flocculation involves separating minerals of one species from minerals of the same species, e.g., the separation of ultrafine kaolin particles from fine or coarse kaolin particles. Flocculation is effected using an ionic material, such as an acid ("acid flocculation"). Sulfuric acid is an inexpensive and widely available acid. Flocculation may be carried in any suitable manner.

Selective flocculation involves separation of ultrafine kaolin particles from discolored titania-ferrous impurities by the aid of conditioning chemicals (such as oleic acid and divalent cation salts) and high molecular weight/highly anionic acrylamide polymer in a settling vessel such as classifier or thickener. Methods of separating kaolin particles from titania-ferrous impurities using selective flocculation technique are described in U.S. Pat. No. 5,535,890.

Flotation is performed in any conventional manner including wet flotation, ultraflotation, froth flotation, TREP flotation (titania removal and extraction process), and the like. General methods of flotation are described in Mathur, S., "Kaolin Flotation", Journal of Colloid and Interface Science, 256, pp. 153-158, 2002, which is hereby incorporated by reference in this regard. See also U.S. Pat. No. 8,557,037.

Generally, bleaching involves increasing the brightness of the kaolin. Reductive bleaching involves contacting the coarse kaolin stream with a suitable amount of one or more of hydrosulfite (dithionite) salts, potassium permanganate, alkali bichromates, ammonium persulfate, and the like. See, e.g., U.S. Pat. No. 3,353,668. In some embodiments, the method for preparing the kaolin product does not include reductive bleaching. Thus, the kaolin stream can be free or substantially free of soluble salts from the bleaching process. The presence of soluble salts such as potassium permanganate and zinc hydrosulfite can affect the kaolin product. For example, a high concentration of soluble salts can cause a higher +325 mesh residue content, coarser particle size, or undesirably large increases in oil absorption. The presence of soluble salts can also flocculate the kaolin which may affect processing the kaolin. For example, a high concentration of soluble salts can cause high viscosity of the kaolin product in paper use, or lower the temperature of vitrification in ceramic utilization.

Ozonation/oxidative bleaching involves oxidative bleaching, using ozone, in order to bleach components, such as organic discolorants, that may be present. The ozone acts not only to destroy substantial portions of discoloring organics, but also destroys by oxidation the organic dispersant, if such a compound is present. However, the ozone does not destroy inorganic dispersants. Ozonation is performed in any suitable manner. In a non-limiting example, ozonation may be performed at a dosage level from about 0.1 to about 20 pounds of ozone per ton of kaolin. In another embodiment, ozonation is performed at a dosage level from about 0.5 to about 10 pounds of ozone per ton of kaolin. The ozone may be applied as a stream of bubbles which can be passed upwardly through the slurry. This can be a batch process or a continuous process in which the ozone bubbles pass counter current to a flow of the slurry in a pipe or other conduit, such as mixed and packed column.

After the blunged/degritted hydrous kaolin crude feedstock is processed by a classification step and a beneficiation step, the result is a first feedstream having at least about 88-89% by weight of the particles have size of 1 µm or less.

Optionally, the blunged/degritted hydrous kaolin crude feedstock is subject to two classification steps, e.g., a coarse size classification, and finer size classification. In an embodiment in which the feedstock is subject to two classification steps, the first feedstream produces has at least 70% by weight of the particles have size of <0.3 microns. In an embodiment in which the feedstock is subject to two classification steps, the first feedstream produces has at least 86% by weight of the particles have size of <0.5 microns.

Optionally, the method includes a further beneficiation step on the blunged/degritted hydrous kaolin crude feedstock. In an embodiment, the blunged/degritted hydrous kaolin crude feedstock is subject to ozonation and flotation beneficiation steps. In an embodiment, the blunged/degritted hydrous kaolin crude feedstock is subject to magnetic separation and acid flocculation beneficiation steps.

The first feedstream is then subjected to a second beneficiation step of filtering to produce a filter cake. Filtering serves to remove solubilized impurities along with by-products salts by dewatering, typically following by rinsing with clean water.

In an embodiment, the method further comprises a second classification step prior to the filtering step. Specifically, the first feedstream is classified by centrifugation to provide a fines fraction having a fine particle size distribution of at least about 97-98% by weight of the particles have size of 1 µm or less. The fines fraction of the first feedstream is then filtered to produce a filter cake product. The fine fraction optionally may be flocculated prior to filtration. See FIG. 2.

Centrifugation can be done in a single or multiple steps by using solid bowl or disc nozzle centrifuges to provide the desired particle fineness. In a high-speed centrifugation treatment the centrifuge may operate at "g" forces from above about 1,000 to about 10,000. In another embodiment, the high-speed centrifugation treatment the centrifuge may operate at "g" forces from about 2,000 to about 7,500. In yet another embodiment, the high-speed centrifugation treatment the centrifuge may operate at "g" forces from above about 2,500 to about 5,000.

The filter cake produced by the filtering step is then dispersed in a sodium-free dispersion agent to provide a second feedstream. Exemplary sodium-free dispersants include ammonia-based dispersants. Exemplary ammonia-based dispersants include ammonia, ammonium polyacrylate, ammonium polyphosphate, AMP-95 (2-amino-2-methyl-1-propanol) or combination thereof.

The second feedstream is then dried and heat treated. Drying can be carried by any conventional method in the art. Examples suitable for drying kaolin include spray drying, flash drying, rotary drying, or other conglomeration techniques.

The dried kaolin is typically pulverized prior to the heat treatment. Pulverization may be conducted in any suitable manner. In one embodiment, the kaolin is pulverized at least once. In another embodiment, the kaolin is pulverized in at least two separate acts (twice pulverized). The pulverization may break up any agglomerates that may be present. Such agglomerates may form during drying, changing the particle size achieved by high-speed centrifugation and other method steps.

When kaolin is heated, it undergoes a series of characteristic changes, detectable by various methods including differential thermal analysis (DTA). Heat treatment may be employed to form one or more of metakaolin, partially calcined kaolin, and fully calcined kaolin, depending on the temperature/duration of the heat treatment. In an embodiment, the heat treatment employed results in fully calcined kaolin. As used herein, "fully calcined kaolin" refers to kaolin that has been heat treated at a temperature from 900° C. to about 1200° C. In an embodiment, the heat treatment employed results in metakaolin.

Heat treatment is performed under one of an inert atmosphere, an oxidizing atmosphere, and a reducing atmosphere. Calcining destroys the crystallinity of hydrous kaolin and renders the kaolin substantially amorphous. Calcination occurs after heating at temperatures in the range from about 700 to about 1200° C. for a sufficient period of time. Commercial vertical and horizontal rotary calciners can be used to produce metakaolin, partially calcined kaolin, and/or calcined kaolin. Operation is controlled to avoid calcining at sufficiently high temperatures to form unwanted mullite ($3Al_2O_3 \cdot SiO_2$).

The heat treated kaolin may be subject to addition wet centrifugation or air classification steps, to produce an even finer size distribution production. For instance, a fully calcined kaolin may be slurried at 20 wt. % in water, and subjected to centrifugation to produce an even finer size fraction.

In some methods in the prior art, a delamination step is carried out during the refining of kaolin, for instance after classification. Delamination processes include ball milling, media grinding (including stirred media grinding and/or high energy media grinding). In an embodiment of the present method, the method excludes any delamination process.

In certain embodiments, the method for preparing the heat-treated kaolin product can include providing a first kaolin feedstream having at least about 88-89% by weight of the particles having size of 1 µm or less; classifying the first kaolin feedstream by centrifugation to provide a fine particle size distribution of at least about 97-98% by weight of the particles having size of 1 µm or less; filtering the first kaolin feedstream to produce a filter cake; dispersing the filtrate in a sodium-free dispersion agent to provide a second kaolin feedstream; and drying and heat treating the second kaolin feedstream, wherein the method for preparing the heat-treated kaolin does not include a bleaching step. The method can provide a heat-treated kaolin product as described herein.

The improved optical (gloss and light scattering) properties with finer and narrow particle size distribution of the kaolin of the disclosure should be highly advantageous for applications such as thermal paper, industrial and architectural coatings, and the like. For architectural or industrial coatings, calcined kaolin pigment should improve coverage, and optical properties, thus resulting in use of less calcined pigment as compared to the prior art or reduction of $TiO_2$ for achieving similar optical properties.

In an embodiment, the kaolin disclosed herein is used in thermal paper. In thermal paper applications when used as the base coating, the inventive pigments should improve the insulation capacity, coverage, smoothness and wax absorption of the pre-coating used in direct thermal paper. Thermal paper typically has at least three layers: a substrate layer, an active layer for forming an image, and a base layer between the substrate layer and active layer. The base layer contains a binder and a calcined kaolin as a porosity improver, and may further and optionally contain a dispersant, wetting agent, and other additives. The porosity improver contributes to the desirable thermal effusivity properties of the base layer. The base layer contains a sufficient amount of a porosity improver to contribute to providing insulating properties, such as a beneficial thermal effusivity, that facilitate high quality image formation in the active layer. In one embodiment, the base layer contains about 5% by weight or more and about 95% by weight or less of a porosity improver. In another embodiment, the base layer contains about 15% by weight or more and about 90% by weight or less of a porosity improver. In yet another embodiment, the base layer contains about 15% by weight or more and about 40% by weight or less of a porosity improver. See, e.g., U.S. Pat. No. 7,902,117.

In addition, the calcined kaolin material can be used in paper, and in particular, pigment for thermal paper base coating, coatings, wire and cable, plastics, tire and rubber, construction. Exemplary monomers for use in preparing paper coating or binding formulations comprising calcined kaolin are disclosed in U.S. Pat. No. 8,642,182.

Additionally, due to the lower abrasion and other physical properties, the calcined kaolin of the disclosure can also be used in paper coating and filling.

The calcined kaolin of the disclosure can also be surface treated using silanes for wire and cable and other engineered plastics applications.

In an embodiment, the heat-treated kaolin of the disclosure can be used in an industrial or architectural coating. The kaolin of the disclosure provides a higher contrast ratio which indicates improved higher power, improved whiteness and brightness, and/or higher tinting strength in such a coating, compared to commercial kaolins currently available.

Accordingly, the kaolin disclosed herein can be used for a variety of applications. Non-limiting uses for the calcined kaolin disclosed herein include the manufacture of paper and paperboard products, paper coatings, ceramic products, paints, polymers, rubbers, engineered plastics, and inks. The kaolin process described herein can also be used to process any type of crude kaolin clay: soft and hard, different colors (grey, white, cream, yellow, brown, red, and pink), and mixtures thereof.

EXAMPLES

The products, compositions and methods of making and using are further described in detail by reference to the following experimental examples. These examples are provided for purposes of illustration only, and are not intended to be limiting unless otherwise specified. Thus, the products, compositions and methods of the disclosure should in no way be construed as being limited to the following examples, but rather, should be construed to encompass any and all variations which become evident as a result of the teaching provided herein.

Properties described in the following examples were assessed by the following methods.

Particle size distribution (PSD) was measured by sedimentation of the particle material in a fully dispersed condition in a standard aqueous medium, such as water, using a SEDIGRAPH 5100 particle size analyzer (Micromeretics Corporation). The data are reported as equivalent spherical diameters (e.s.d.) on a weight percentage basis. The mean particle size $d_{50}$ is the value determined in this way of the particle e.s.d. at which there are 50% by weight of the particles that have an e.s.d. less than the $d_{50}$ value.

Brightness was determined by the TAPPI standard method T452. The data are reported as the percentage reflectance to light of a 457 nm wavelength (GEB value).

Einlehner abrasion loss was determined by an Einlehner AT 1000 Abrasion tester, using 15% by weight solids and 100,000 revolutions. The Einlehner abrasion is reported in mg loss/100,000 revolutions (mg loss/$10^5$ rev).

Oil absorption was determined using ASTM D 281 "Oil Absorption by Spatula Rub-out." The data are reported in pounds of oil absorbed per 100 pounds of calcined kaolin (%).

Surface area was determined by the art-recognized BET method using $N_2$ as the adsorbate.

Examples 1 and 2 were prepared from exclusively grey kaolin crude of the tertiary crude type.

Example 1

This example provides data for a calcined kaolin prepared according to the present disclosure and a comparative commercially available calcined kaolin. The commercially available calcined kaolin (also referred to herein as "control kaolin") is produced from a chemically dispersed blunged/degritted hydrous kaolin crude feedstock that is subject to a classification step and a beneficiation step to produce a feedstream for calcination. The control kaolin feedstream has 88-89%<1 micron particle size, as measured by SEDIGRAPH 5100 particle size analyzer (Micromeritics Corporation, USA). The comparative calcined kaolin in this example, Comparative Sample 1 was prepared by obtaining a sample of the control kaolin feedstream, and spray drying it in the laboratory. The dried material was then pulverized using a Micro pulverizer equipped with a 0.020" screen and then calcined in a laboratory muffle furnace at 1,079° C. (i.e., 1,975° F.) for a 60 minute soak time. The resulting calcined kaolin product was then pulverized using the Micro pulverizer equipped with 0.020" screen.

Sample 1 is an embodiment of the inventive calcined kaolin. Sample 1 was made by diluting kaolin from the control kaolin feedstream to about 30% solids, followed by centrifugation to obtain a fines fraction with 97-98%<1 micron particle size. Fines fractions obtained from centrifugation step were then subjected to flocculation ("flocked") using 8 lbs/ton of alum and sulfuric acid at pH=3.5, followed by lab vacuum filtration to dewater and remove soluble salts. The resulting filter cake contained about 55% solids. The filter cake was then re-dispersed with ammonium hydroxide at pH about 10.0. The dispersed filter slip was then spray dried, pulverized and calcined in a laboratory muffle furnace at 1,079° C. (i.e., 1,975° F.) for 60 minutes soak time, as described for Comparative Sample 1. The resulting calcined kaolin was then pulverized using the Micro pulverizer, as described for Comparative Sample 1.

Physical and optical properties of Comparative Sample 1 and Sample 1 were measured. Table 7 below shows the properties of Comparative Sample 1 (commercially available calcined kaolin), and Sample 1 (the inventive calcined kaolin).

TABLE 7

| | Comparative Sample 1 Commercially available calcined kaolin | Sample 1 Inventive Calcined Kaolin |
|---|---|---|
| G.E. Brightness, % | 92.3 | 93.9 |
| Einlehner Abrasion loss in mg/$10^5$ rev | 18.1 | 13.2 |

TABLE 7-continued

| | Comparative Sample 1 Commercially available calcined kaolin | Sample 1 Inventive Calcined Kaolin |
|---|---|---|
| Oil Absorption, % | 89 | 110 |
| Surface Area (m²/g) | 16.9 | 19.9 |
| +325 mesh Residue, % | 0.0095 | 0.0016 |
| PSD | | |
| % ≤10 μm | 96 | 100 |
| % ≤5 μm | 92 | 96 |
| % ≤2 μm | 82 | 91 |
| % ≤1 μm | 65 | 86 |
| % ≤0.5 μm | 19 | 37 |
| % ≤0.3 μm | 6 | 7 |
| % ≤0.2 μm | 3 | 5 |
| Median Particle Size, μm | 0.77 | 0.57 |

As shown in Table 7, Sample 1 has significantly higher GE brightness and lower Einlehner abrasion value than the Comparative Sample 1. Further, Sample 1 has a much finer and narrower particle size distribution both at the coarse end (>5 microns) and the fine end (<2 microns) of distribution, as well as a finer median particle size, compared to the Comparative Sample 1. In addition, oil absorption value for Sample 1 is markedly increased, which is a desirable property for certain applications such as architectural and industrial coatings and thermal paper applications (wax absorption etc.). The inventive calcined kaolin product had a lower +325 mesh residue content of 0.0016% (16 ppm) compared to 0.0095% (95 ppm) for the Comparative Sample 1. The data also show that surface area of Sample 1 is increased from 16.9 m²/g for Comparative Sample 1 to 19.9 m²/g for the inventive calcined kaolin. This is another indication of finer particle size distribution of inventive calcined kaolin product. Thus, the additional processing steps used to prepare Sample 1 advantageously result in a calcined kaolin that has improved optical properties, improved oil absorption, improved surface area, and reduced abrasion, compared to Comparative Sample 1.

Example 2

In this example, another calcined kaolin prepared according to the present disclosure was prepared and compared to Comparative Sample 1 (regular ANSILEX® 93). The inventive calcined kaolin embodiment, Sample 2, was prepared without additional centrifugation step used to prepare Sample 1. Sample 2 was prepared by diluting kaolin from the regular ANSILEX® 93 feed to about 25% solids, followed by flocculation using 8 lbs/ton of alum and sulfuric acid at pH=3.5 followed. The resulting flocked clay was then subjected to filtration using the lab vacuum filtration system to dewater and remove soluble salts. The resulting filter cake contained about 55% solids. The filter cake was then re-dispersed with ammonium hydroxide at pH about 10.0. The dispersed filter slip was then spray dried, pulverized and calcined in a laboratory muffle furnace at 1,079° C. (i.e., 1,975° F.) for 60 minutes soak time, as described in Example 2. The resulting calcined kaolin was then pulverized using the lab Micro pulverizer, and physical and optical properties of Sample 2 were measured. The data are presented in Table 8.

TABLE 8

|  | Comparative Sample 1 Commercially available calcined kaolin | Sample 2 Inventive Calcined Kaolin |
|---|---|---|
| G.E. Brightness, % | 92.3 | 92.4 |
| Einlehner Abrasion loss in mg/$10^5$ rev | 18.1 | nd |
| Oil Absorption, % | 89 | 109 |
| Surface Area ($m^2$/g) | 16.9 | 17.8 |
| +325 mesh Residue, % | 0.0095 | 0.0072 |
| PSD |  |  |
| % ≤10 μm | 96 | 100 |
| % ≤5 μm | 92 | 97 |
| % ≤2 μm | 82 | 90 |
| % ≤1 μm | 65 | 77 |
| % ≤0.5 μm | 19 | 29 |
| % ≤0.3 μm | 6 | 4 |
| % ≤0.2 μm | 3 | 0 |
| Median Particle Size, μm | 0.77 | 0.63 |

"nd" = not determined

As shown in Table 8, the brightness of Sample 2 is similar to Comparative Sample 1. However, Sample 2 (the inventive calcined kaolin) has a finer and narrower particle size distribution both at the coarse end (>5 microns) and the fine end (<2 microns) of distribution, as well as a finer median particle size in comparison to Comparative Sample 1. The data also show that surface area of the inventive calcined kaolin is increased slightly from 16.9 $m^2$/g for regular ANSILEX® 93 to 17.8 $m^2$/g for inventive calcined kaolin. The inventive calcined kaolin product had a lower +325 mesh residue content of 0.0072% (72 ppm) compared to 0.0095% (95 ppm) for the Comparative Sample 1. There is also an increase in oil absorption value for the inventive kaolin as compared to Comparative Sample 1.

The results presented in Examples 1 and 2 (Table 7 and Table 8) demonstrate the significance of an additional centrifugation step for obtaining a finer calciner feedstream that results in the calcined kaolin product with much finer and narrower particle size distribution, as well as other improved properties (e.g., higher GE brightness, lower Einlehner abrasion, higher surface area, higher oil absorption), compared to Comparative Sample 1. The data in Examples 1 and 2 also clearly illustrate the additional benefits of filtration combined with using an ammonia-based filter dispersant that results in a finer and narrower particle size distribution inventive calcined product as well. Thus, the additional processing steps used to prepare inventive Samples 1 and 2 advantageously result in a calcined kaolin that has both a finer and a narrower particle size distribution as compared to the prior art.

Example 3

The inventive calcined kaolin embodiment, Sample 3, in this example was produced from an ultra-fine hydrous kaolin feedstream, obtained from BASF's kaolin manufacturing operations. The kaolin in this feedstream contains about 50% grey crudes, the balance being the other types of crudes including white, cream, brown, reddish, pink colored crudes. The ultra-fine hydrous kaolin feedstream is prepared from a chemically dispersed hydrous kaolin crude feedstock subjected to coarse size classification, flotation, ozonation, and ultra-fine size classification steps at BASF's manufacturing operations. A disc-nozzle centrifuge (Alpha Laval) is utilized to obtain the ultra-fine size with at least 70% by weight of the particles less than 0.3 microns.

In this example, the fines fraction from the plant Alpha-Laval centrifuge with 73%<0.3 microns particle size was flocked, filtered and re-dispersed using ammonia as the dispersant at pH about 10.0, as described in Example 1. The re-dispersed filter product was then spray dried followed by pulverization with a Micro pulverizer. The prepared feed material was then calcined in a lab muffle furnace at 1,079° C. (1975° F.) temperature for 60 min soak time. The resulting calcined product was then pulverized using a Micro pulverizer, and physical and optical properties of Sample 3 were measured.

Comparative 2 was prepared in the same way as Sample 3, except that the filter cake was re-dispersed using a sodium based dispersant (instead of using ammonia). Specifically, a blend of sodium polyacrylate/soda ash/sodium hexametaphosphate (SAP) was used for re-dispersing filter product at pH about 7. The other process parameters such as spray drying, pulverizing and calcining were kept the same. The particle size distribution of Comparative Sample 2 was measured.

The data are presented in Table 9.

TABLE 9

|  | Comparative Sample 1 | Sample 3 Inventive Calcined Kaolin (Ammonia Dispersed) | Comparative Sample 2 (SAP Dispersed) |
|---|---|---|---|
| G.E. Brightness, % | 92.3 | 94.3 | nd |
| Einlehner Abrasion loss in mg/$10^5$ rev | 18.1 | 10.1 | nd |
| Oil Absorption, % | 89 | 113 | nd |
| Surface Area ($m^2$/g) | 16.9 | 20.8 | nd |
| +325 mesh Residue, % | 0.0095 | 0.0051 | nd |
| PSD |  |  |  |
| % ≤10 μm | 96 | 99 | 94 |
| % ≤5 μm | 92 | 94 | 84 |
| % ≤2 μm | 82 | 89 | 73 |
| % ≤1 μm | 65 | 82 | 63 |
| % ≤0.5 μm | 19 | 33 | 22 |
| % ≤0.3 μm | 6 | 17 | 4 |
| % ≤0.2 μm | 3 | 7 | 1 |
| Median Particle Size, μm | 0.77 | 0.59 | 0.75 |

"nd" = not determined

As shown in Table 9, the inventive calcined kaolin which is dispersed using ammonia at the filter step has a finer and narrower particle size distribution both at the coarse end (>5 microns) and the fine end (<2 microns) of distribution, as well as finer median particle size, compared to Comparative Sample 1. In contrast, Comparative Sample 2 (the filter product dispersed using sodium based dispersants) results in a much coarser particle size calcined product. From this example, one can appreciate the advantages of using ammonia as the secondary dispersant at the filtration step for obtaining finer and narrow particle size inventive calcined product.

Sample 3 (the inventive calcined kaolin) has significantly higher GE brightness and lower Einlehner abrasion value compared to Comparative Sample 1. The inventive calcined kaolin product had a lower +325 mesh residue content of 0.0051% (51 ppm) compared to 0.0095% (95 ppm) for the Comparative Sample 1. In addition, surface area of the inventive calcined kaolin is increased remarkably from 16.9 $m^2$/g for Comparative Sample 1 to 20.8 $m^2$/g for inventive calcined kaolin. There is also significant increase in oil absorption value for inventive kaolin compared to Comparative Sample 1.

Figure 4:
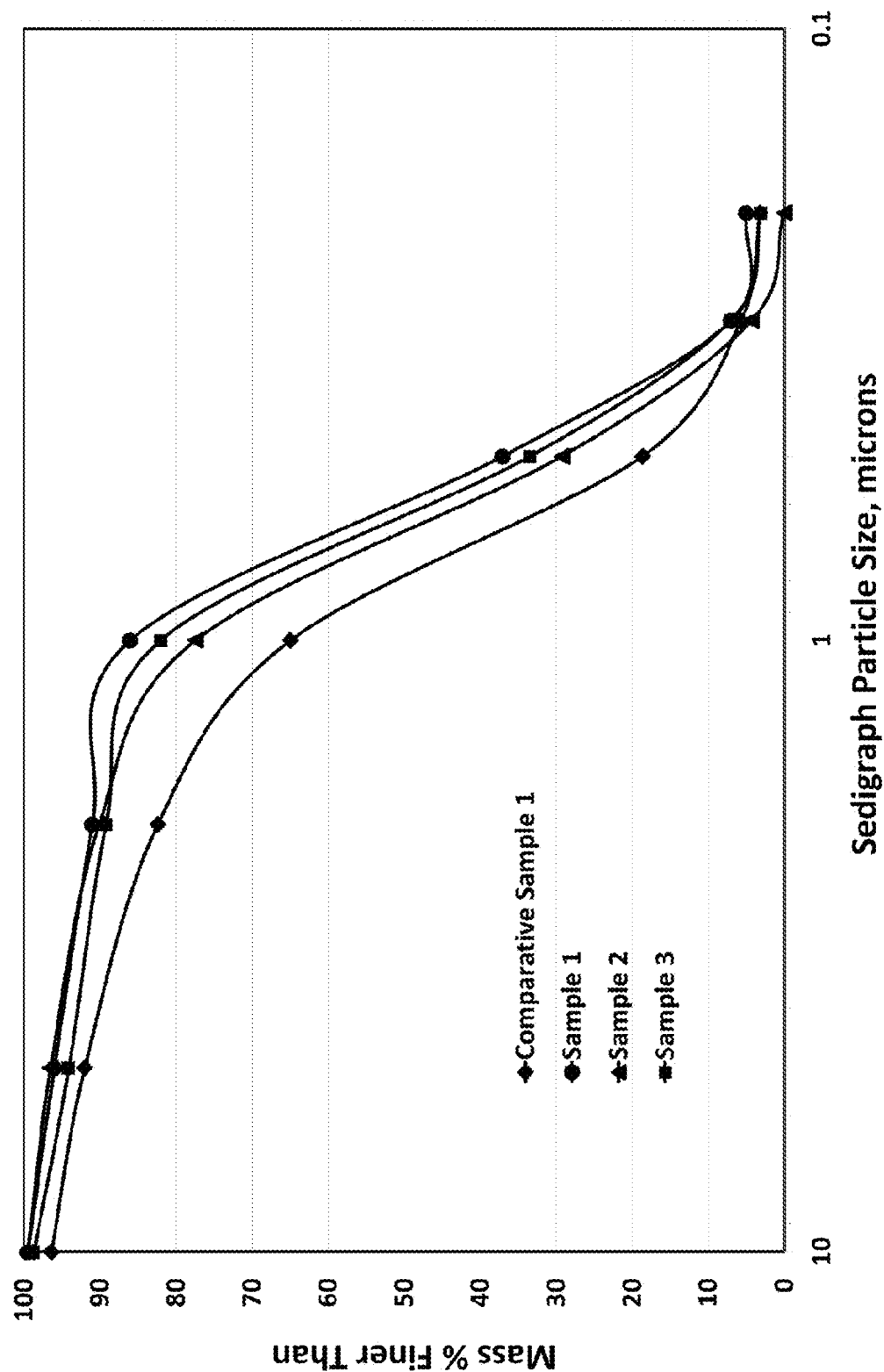
FIG. 4 depicts particle size distribution data (obtained using a Sedigraph 5100 particle size analyzer) in graph form for Samples 1-3 according to the present disclosure and Comparative Sample 1.

The particle size distributions for Samples 1-3 (embodiments of the inventive calcined kaolin) and Comparative Sample 1 (commercially available calcined kaolin) is depicted graphically in FIG. 4. The curves for the particle distribution of Samples 1-3 are steeper than the curve for the comparative sample, indicative of the narrower particle size distribution for Samples 1-3, compared to Comparative Sample 1.

Example 4

Light scattering data for Comparative Sample 1 and Samples 1-3 (the inventive calcined kaolin) are shown in Table 10. Light scattering was determined by applying a film of pigment onto optically smooth black glass from a 30% solids (by weight) mixture of pigment and water using a 0.25 mil Bird Bar. The reflectance values of the pigment films after air drying are measured at wavelengths of 457 nm and 577 nm by means of a reflectance meter having an integrated sphere geometry like an Elrepho reflectometer. The reflectance values are converted by the use of Kubelka-Munk equations to light scattering coefficients ($m^2/g$). Similar to light scattering, gloss is determined by applying a film of pigment onto optically smooth black glass from a 30% solids (by weight) mixture of pigment and water using a 0.25 mil Bird Bar. Gloss is measured using a Technidyne T480 gloss meter (Technidyne Corporation, New Albany, Ind.) at 75 degrees (PL Method 50C).

TABLE 10

|  | Comparative Sample 1 | Sample 1 Inventive Calcined Product | Sample 2 Inventive Calcined Product | Sample 3 Inventive Calcined Product |
| --- | --- | --- | --- | --- |
| Gloss, % | 31.3 | 43.3 | 36.6 | 31.0 |
| $S_{457}$ ($m^2/g$) | 0.271 | 0.331 | 0.309 | 0.327 |
| $S_{577}$ ($m^2/g$) | 0.214 | 0.229 | 0.225 | 0.227 |

The data in Table 10 demonstrate that the method of the disclosure produces calcined kaolin with improved light scattering properties at both wavelength 457 nm and wavelength 577 nm. Additionally, there is significant gloss improvement for the inventive calcined kaolin products compared to Comparative Sample 1. Sample 1 exhibits a particularly large improvement in gloss, having a gloss that is over 30% larger than that of Comparative Sample 1. The improved light scattering and gloss properties are an indication of similar or better morphology for the inventive calcined product as compared to Comparative Sample 1.

Example 5

Chemical composition for Comparative Sample 1 and the inventive calcined kaolin Samples 1-3 was obtained by determination of the bulk elemental composition using a Panalytical X-Ray Fluorescence Spectroscopy (XRF). In this analytical measurement procedure with the XRF machine, prior to placing the samples to the XRF carousel, each sample is first dried in an oven to ensure the surface moisture is removed, followed by firing samples in a muffle furnace at 1,000° C. for 60 minutes to determine loss-on-ignition (LOI) value. After this step, the sample is cooled down in a desiccator and pressed into a pellet using cellulose as the binder (note that cellulose is inert for XRF analysis performed on kaolin samples).

Table 11 contains XRF data for the three inventive calcined products as well as Comparative Sample 1. The XRF produces a list of the percentages of nine chemical elements (Si, Al, Na, K, Ti, Fe, Ca, Mg and P) expressed as oxides: Sift, $Al_2O_3$, $Na_2O$, $K_2O$, $TiO_2$, $Fe_2O_3$, CaO, MgO, and $P_2O_5$. The results are reported on volatile free basis. Also presented in the table are the LOI values for each product.

TABLE 11

|  | Comparative Sample 1 | Sample 1 Inventive Calcined Product | Sample 2 Inventive Calcined Product | Sample 3 Inventive Calcined Product |
| --- | --- | --- | --- | --- |
| % $SiO_2$ | 53.5 | 53.3 | 53.8 | 54.6 |
| % $Al_2O_3$ | 45.9 | 45.6 | 45.8 | 46.6 |
| % $Na_2O$ | 0.32 | 0.08 | 0.08 | 0.09 |
| % $K_2O$ | 0.18 | 0.18 | 0.22 | 0.16 |
| % $TiO_2$ | 1.67 | 1.45 | 1.73 | 0.52 |
| % $Fe_2O_3$ | 0.92 | 0.93 | 0.96 | 0.94 |
| % CaO | 0.11 | 0.09 | 0.08 | 0.02 |
| % MgO | 0.04 | 0.05 | 0.05 | 0.06 |
| % $P_2O_5$ | 0.11 | 0.08 | 0.09 | 0.07 |
| Total | 102.8 | 101.8 | 102.8 | 103.0 |
| % LOI | 0.30 | 0.35 | 0.29 | 0.30 |

As can be seen from the data in Table 11, Samples 1 through 3 contain only about a quarter of the sodium contained by Comparative Sample 1. Thus, the processing steps used to prepare Samples 1 through 3 advantageously result in a large reduction in sodium content.

It is believed, without being held to theory, that sodium, for instance from a sodium dispersant used in preparing a chemically dispersed blunged/degritted hydrous kaolin crude feedstock, fills pores in the kaolin particles during calcination thus reducing surface area and pore volume of final calcined product. The reduction in sodium content is therefore believed to contribute to the improved oil absorption and surface area properties of the kaolin prepared according to the method of this disclosure.

In addition, the amount of discolored titania (anatase) impurity is reduced to a great degree from about 1.7% for Comparative Sample 1 to 1.45% for Sample 1 due to the additional centrifugation step applied to remove coarser and denser particles, including discolored titania impurities. Sample 3 also has a reduced amount of $TiO_2$, indicating that the method used to prepare Sample 3 reduces titanium contamination in the kaolin feedstream.

Therefore, the processing steps used to prepare Sample 1 and 3 advantageously result in a favorable reduction in titania content, which in turn results in better calcination response and higher brightness product (see Sample 1 in Table 7 and Sample 3 in Table 9).

Chemical composition was also determined for the kaolin samples dispersed using ammonia (Sample 3) or sodium-based dispersant (Comparative Sample 2), described in Example 3. Sample 3 and Comparative Sample 2 are prepared identically except for the dispersants used during the filtration step prior to calcination. The data are presented in Table 12.

TABLE 12

| Dispersant Used at Filter Step | Comparative Sample 2 Not Inventive Calcined Kaolin Sodium Based (SAP) | Sample 3 Inventive Calcined Kaolin Ammonia |
|---|---|---|
| % $SiO_2$ | 53.9 | 54.6 |
| % $Al_2O_3$ | 45.8 | 46.6 |
| % $Na_2O$ | 0.46 | 0.09 |
| % $K_2O$ | 0.16 | 0.16 |
| % $TiO_2$ | 0.53 | 0.52 |
| % $Fe_2O_3$ | 0.93 | 0.94 |
| % CaO | 0.02 | 0.02 |
| % MgO | 0.06 | 0.06 |
| % $P_2O_5$ | 0.22 | 0.07 |
| Total | 102.1 | 103.0 |
| % LOI | 0.32 | 0.30 |

Chemical composition was also determined for the kaolin samples dispersed using ammonia (Sample 3) or sodium-based dispersant (Comparative Sample 2), described in Example 3. Sample 3 and Comparative Sample 2 are prepared identically except for the dispersants used during the filtration step prior to calcination. The data are presented in Table 12.

The data for Sample 3 and Comparative Sample 2, as presented in Table 12, illustrate that use of an ammonia-based dispersant significantly reduces sodium content of the final calcined product, compared to calcined kaolin products prepared using an sodium-based dispersant. For instance, Sample 3 contains only about 20% of the sodium present in Comparative Sample 2 in which the calciner feed was dispersed using a sodium-based dispersant. It is also notable that there is about 32% reduction in $P_2O_5$ value for the inventive kaolin product as well. This result suggests that the phosphate (likely as a result of using sodium hexa metaphosphate in sodium based dispersant) is also removed from the kaolin surface during the filtration step (removed with the filtrate). The presence of excessive amount of alkalis, such as sodium, in calciner feed materials can lead to fluxing during calcination, which causes aggregation of particles. Therefore, any reduction in sodium obtained by the method of the disclosure, as illustrated in Examples 1, 2 and 3, is also believed to reduce the incidence and/or the extent of fluxing during calcination, and thereby contribute to the improved narrow particle size distribution and improve morphology of the final calcined kaolin product obtained by the method of the disclosure.

Example 6

A paint was prepared comprising either a commercially available fine calcined kaolin (Comparative Sample 4) or a calcined kaolin of this disclosure (Sample 4). The paint formulation is shown in Table 13.

TABLE 13

| 75 PVC Formula | |
|---|---|
| Component | Parts |
| Water | 253.8 |
| Cellulosic Thickener | 4.9 |
| Dispersing Agent | 2.0 |
| Wetting Agent | 2.0 |
| Defoamer | 2.5 |
| Biocide | 3.0 |
| Propylene Glycol | 20.0 |
| General Purpose $TiO_2$ | 100.0 |
| $CaCO_3$, 5 micron | 280.0 |
| Kaolin | 75.0 |
| Water | 40.3 |
| Buffer | 1.8 |
| Defoamer | 1.0 |
| Coalescent | 7.0 |
| Vinyl acrylic emulsion | 200.0 |
| Total | 993.30 |

The properties of the two paint formulations were characterized by: viscosity, contrast ratio, brightness, whiteness, yellowness, Hunter L, a, and b values, gloss at 20 degrees and at 60 degrees, sheen at 85 degrees, and tint strength.

Viscosity is a measure of resistance to flow. Viscosity was measured using a Stormer viscometer and is expressed as Krebs Units (KU).

Contrast ratio was determined by measuring reflectance over a black substrate and over a white substrate using a Hunter Spectrophotometer. The contrast ratio is the ratio of reflectance of black/reflectance of white. Whiteness, Yellowness, and Hunter L, a, b values were measured using a Hunter Spectrophotometer.

Gloss and sheen were measured using a gloss meter at three angles of incidence (20, 60 and 85).

Tinting Strength was assessed using a white base containing the kaolin that was tinted (black colorant added) and reflectance of the corresponding gray was measured. Comparative Sample 4 was measured against Sample 4 and the lightness of the gray shade is given a numerical value based on the reflectance. The higher the tinting strength, the lighter is the shade.

The data are shown in Table 14.

TABLE 14

| Property | Comparative Sample 4 | Sample 4 |
|---|---|---|
| Viscosity, KU | 103 | 105 |
| Contrast Ratio 3 mils | 95.1 | 96.1 |
| Brightness | 87.43 | 88.12 |
| Whiteness | 79.77 | 80.50 |
| Yellowness | 2.64 | 2.60 |
| Hunter L | 95.83 | 96.11 |
| Hunter a | −0.62 | −0.61 |
| Hunter b | 2.08 | 2.05 |
| Gloss @ 20 degrees | 1.4 | 1.4 |
| Gloss @ 60 degrees | 2.4 | 2.8 |
| Sheen @ 85 degrees | 4.3 | 8.8 |
| Tint Strength | 100.0 | 115.5 |

These data show improved hiding power (higher contrast ratio), improved whiteness and brightness and much higher tinting strength for Sample 4, containing a calcined kaolin of this disclosure, compared to Comparative Sample 4. Higher tinting strength advantageously allows reduction of $TiO_2$ thereby reducing overall formulation costs.

The disclosures of each and every patent, patent application, and publication cited herein are hereby incorporated herein by reference in their entirety for all purposes.

While the products, compositions, methods of making them, and their methods of use have been disclosed with reference to specific embodiments, it is apparent that other embodiments and variations may be devised by others skilled in the art without departing from the true spirit and scope of the described products and methods. The appended claims are intended to be construed to include all such embodiments and equivalent variations.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise. The disclosure of percentage ranges and other ranges herein includes the disclosure of the endpoints of the range and any integers provided in the range.

What is claimed is:

1. A fully or partially calcined kaolin having a GE brightness of at least about 92 and a particle size distribution of:
   equal to or greater than 99% by weight of particles with an equivalent spherical diameter (e.s.d.) of less than 10 microns;
   equal to or greater than 93% by weight of particles with an e.s.d. of less than 5 microns;
   equal to or greater than 85% by weight of particles with an e.s.d. of less than 2 microns;
   equal to or greater than 77% by weight of particles with an e.s.d. of less than 1 micron; and
   equal to or greater than 25% by weight of particles with an e.s.d. of less than 0.5 microns,
   wherein the fully or partially calcined kaolin has a +325 mesh residue content of 300 ppm or less and a median particle size of from 0.50 to 0.59 microns.

2. The fully or partially calcined kaolin according to claim 1 having a particle size distribution of:
   99% to 100% by weight of particles with an e.s.d. of less than 10 microns;
   93% to 100% by weight of particles with an e.s.d. of less than 5 microns;
   85% to 98% by weight of particles with an e.s.d. of less than 2 microns;
   77% to 92% by weight of particles with an e.s.d. of less than 1 micron; and
   25% to 46% by weight of particles with an e.s.d. of less than 0.5 microns.

3. The fully or partially calcined kaolin according to claim 1, having a +325 mesh residue content of 90 ppm or less.

4. The fully or partially calcined kaolin according to claim 1, having a sodium oxide content less than or equal to 0.1% by weight of the fully or partially calcined kaolin.

5. The fully or partially calcined kaolin according to claim 1, having a GE brightness of at least about 92 to about 96.

6. The fully or partially calcined kaolin according to claim 1, having an oil absorption of greater than 100 to 140 lbs oil/100 lbs fully or partially calcined kaolin.

7. The fully or partially calcined kaolin according to claim 1, having a scattering coefficient at 457 nanometers of about 0.305 to about 0.335 $m^2/g$.

8. The fully or partially calcined kaolin according to claim 1, having a scattering coefficient at 577 nanometers of about 0.223 to about 0.230 $m^2/g$.

9. The fully or partially calcined kaolin according to claim 1, having a surface area of about 17.0 to about 25.0 $m^2/g$.

10. The fully or partially calcined kaolin according to claim 1 having an Einlehner abrasion loss of 9 to 18 mg/$10^5$ rev.

11. The fully or partially calcined kaolin according to claim 1 having a gloss of about 30% to about 45%.

12. A paper coating formulation or paper binding formulation comprising a fully or partially calcined kaolin according to claim 1.

13. A paint comprising a fully or partially calcined kaolin according to claim 1.

14. A fully or partially calcined kaolin having a GE brightness of at least about 92 and a particle size distribution of:
   equal to or greater than 99% by weight of particles with an equivalent spherical diameter (e.s.d.) of less than 10 microns;
   equal to or greater than 93% by weight of particles with an e.s.d. of less than 5 microns;
   equal to or greater than 85% by weight of particles with an e.s.d. of less than 2 microns;
   equal to or greater than 77% by weight of particles with an e.s.d. of less than 1 micron; and
   equal to or greater than 25% by weight of particles with an e.s.d. of less than 0.5 microns,
   wherein the fully or partially calcined kaolin has a sodium oxide content of less than or equal to 0.25% by weight of the fully or partially calcined kaolin.

15. The fully or partially calcined kaolin according to claim 14, having a +325 mesh residue content of 300 ppm or less.

16. The fully or partially calcined kaolin according to claim 14, having a GE brightness of at least about 92 to about 96.

17. The fully or partially calcined kaolin according to claim 14, having a median particle size (d50) of 0.50 to 0.59 microns.

18. The fully or partially calcined kaolin according to claim 14, having a surface area of about 17.0 to about 25.0 $m^2/g$.

19. The fully or partially calcined kaolin according to claim 14 having an Einlehner abrasion loss of 9 to 18 mg/$10^5$ rev.

20. The fully or partially calcined kaolin according to claim 14 having a gloss of about 30% to about 45%.

21. A fully or partially calcined kaolin having a GE brightness of at least about 92 and a particle size distribution of:
   equal to or greater than 99% by weight of particles with an equivalent spherical diameter (e.s.d.) of less than 10 microns;

equal to or greater than 93% by weight of particles with an e.s.d. of less than 5 microns;

equal to or greater than 85% by weight of particles with an e.s.d. of less than 2 microns;

equal to or greater than 77% by weight of particles with an e.s.d. of less than 1 micron; and equal to or greater than 25% by weight of particles with an e.s.d. of less than 0.5 microns, wherein the fully or partially calcined kaolin has a +325 mesh residue content of 300 ppm or less and an oil absorption of from 120 to 140 lbs oil/100 lbs fully or partially calcined kaolin.

22. A method for preparing the fully or partially calcined kaolin of claim 1, comprising the steps of:
providing a first kaolin feedstream having at least about 88-89% by weight of the particles having size of 1 μm or less;
classifying the first kaolin feedstream by centrifugation to provide a fine particle size distribution of at least about 97-98% by weight of the particles having size of 1 μm or less;
filtering the first kaolin feedstream to produce a filter cake;
dispersing the filtrate in a sodium-free dispersion agent to provide a second kaolin feedstream; and
drying and heat treating the second kaolin feedstream,
wherein the method for preparing the fully or partially calcined kaolin does not include a reductive bleaching step.

23. The method according to claim 22, further comprising flocculating the first feedstream prior to the filtering step.

24. The method according to claim 22, wherein the sodium-free dispersion agent is an ammonia-based dispersion agent.

25. The method according to claim 22, wherein the second kaolin feedstream has a pH of about 10.

26. The method according to claim 22, wherein heat treating comprises calcining at a temperature of from about 900° C. to about 1200° C. to produce a fully calcined kaolin.

27. The method according to claim 22, wherein the providing step comprises processing a blunged/degritted hydrous kaolin crude feedstock by one or more of magnetic separation, flotation, ozonation, or selective flocculation to produce the first kaolin feedstream having at least about 88-89% by weight of the particles having size of 1 μm or less.

28. The method according to claim 22, wherein the method excludes delamination processes.

29. The method according to claim 22, wherein the classifying step, filtering step, dispersing step, and drying and calcining step exclude a sodium-based dispersion agent.

* * * * *